United States Patent
Meter

(10) Patent No.: US 7,021,552 B2
(45) Date of Patent: Apr. 4, 2006

(54) METHOD AND INSTALLATION FOR CONTROLLING THE TEMPERATURE IN A CONTROLLED-CLIMATE CHAMBER

(75) Inventor: Tjitze Meter, Veenendaal (NL)

(73) Assignee: HatchTech Group B.V., Veenendaal (NL)

( * ) Notice: Subject to any disclaimer, the term of this patent is extended or adjusted under 35 U.S.C. 154(b) by 66 days.

(21) Appl. No.: 10/415,874

(22) PCT Filed: Nov. 19, 2001

(86) PCT No.: PCT/NL01/00835

§ 371 (c)(1),
(2), (4) Date: Aug. 28, 2003

(87) PCT Pub. No.: WO02/39812

PCT Pub. Date: May 23, 2002

(65) Prior Publication Data

US 2004/0028115 A1     Feb. 12, 2004

(30) Foreign Application Priority Data

Nov. 17, 2000   (NL) .................................... 1016636

(51) Int. Cl.
*A01K 31/20*   (2006.01)
(52) U.S. Cl. .................... 236/2; 236/6; 236/91 A; 236/91 C; 119/306; 237/3
(58) Field of Classification Search .................. 236/2, 236/3, 6, 91 A, 91 C; 119/306, 314, 317, 119/319; 47/17; 237/3
See application file for complete search history.

(56) References Cited

U.S. PATENT DOCUMENTS

| | | | | |
|---|---|---|---|---|
| 4,572,427 A | * | 2/1986 | Selfridge et al. | 236/91 C |
| 5,025,619 A | | 6/1991 | Cannon | |
| 5,090,617 A | * | 2/1992 | Swan et al. | 237/3 |
| 5,573,179 A | * | 11/1996 | Timmons et al. | 236/6 |
| 5,792,427 A | * | 8/1998 | Hugh et al. | 236/3 |
| 6,010,243 A | | 1/2000 | Hessler et al. | |
| 6,701,665 B1 | * | 3/2004 | Ton et al. | 47/17 |

FOREIGN PATENT DOCUMENTS

BE   1011911   2/2000

* cited by examiner

Primary Examiner—Harry B. Tanner
(74) Attorney, Agent, or Firm—Kirkpatrick & Lockhart Nicholson Graham LLP

(57) ABSTRACT

The invention relates to a method for controlling the temperature in a controlled-climate chamber, wherein: an organism, such as a plant or an animal, is placed in the controlled-climate chamber; the temperature in the controlled-climate chamber is kept essentially constant at a specific value (T1); at least one growth characteristic (G) of the organism, such as, for example, the $CO_2$ production, is measured; the temperature in the controlled-climate chamber is raised or lowered by a specific value ($\delta T$); the magnitude of the growth characteristic is measured again; the variation in the measured value of the growth characteristic is determined ($\delta G$); and the temperature in the controlled-climate chamber is adjusted, depending on the variation in the measured value of the growth characteristic ($\delta G$) that has been determined.

22 Claims, 1 Drawing Sheet

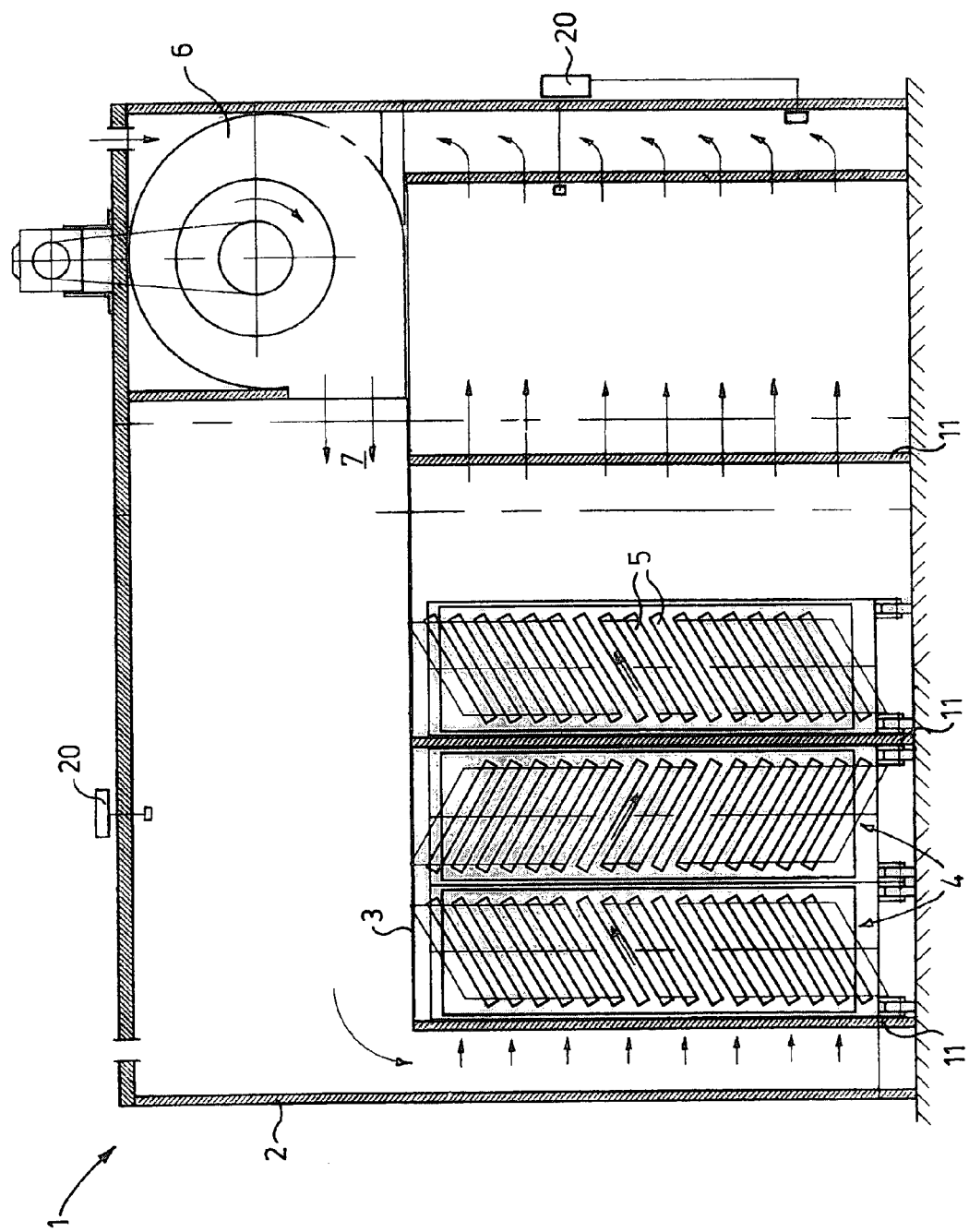

METHOD AND INSTALLATION FOR CONTROLLING THE TEMPERATURE IN A CONTROLLED-CLIMATE CHAMBER

The present invention relates to a method and installation for controlling the temperature in a controlled-climate chamber.

For the sake of clarity it is pointed out that in this text reference is made in particular to a controlled-climate chamber that is specifically equipped for hatching eggs. It must be understood that the invention also relates to controlled-climate chambers in which completely different organisms grow.

The method according to the present invention is in particular suitable for an incubator, such as the incubator that is described in Netherlands Patent 1 009 860 in the name of the Applicant, which relates to a controlled-climate chamber.

The controlled-climate chamber according to the said patent is in particular suitable for hatching eggs. The eggs are placed in the controlled-climate chamber and the climatic conditions are matched as well as possible to the optimum growth conditions for the embryos in the eggs. It is customary to subject the eggs to a temperature progression. This temperature progression starts at approximately 100° F. The temperature is then lowered because the eggs themselves start to produce heat. Currently adjustment of the temperature takes place on the basis of empirical data. There is no direct link between the specific requirements for optimum growth of embryos in a specific batch and the specific climatic conditions that are maintained in the controlled-climate chamber.

Nevertheless there are many factors that determine the specific climatic conditions which have to be maintained in the controlled-climate chamber for hatching the eggs per group of eggs. The first factor that has an influence on the desired optimum conditions is the quantity of eggs that is placed in a controlled-climate chamber. The eggs will themselves produce heat during hatching and eggs next to one another will warm one another. That is to say, the greater the number of eggs that will be present in the controlled-climate chamber, the greater will be the production of heat by the eggs.

A second important parameter that determines the desired conditions for the eggs is the age of the mothers. 28-week old chickens that start to lay will produce relatively small eggs. Such eggs typically have a weight of 45 to 50 gram. Older chickens, for example up to 60 weeks old, will produce larger eggs, typically with a weight of up to 70 grams. The embryos in these eggs are not only larger than those in the case of the smaller eggs, but the air flow around these eggs will take place in a different way to the air flow that takes place around the smaller eggs.

The typical climatic conditions in a controlled-climate chamber are preferably also matched to the genetic material that the embryos in the eggs possess. If the chickens that hatch from the eggs have been bred specifically to produce a relatively large amount of breast fillet, these chickens will produce more heat than if the percentage of breast fillet were to be lower.

Despite the fact that all these factors have an influence on the specific ideal climatic conditions in the controlled-climate chamber, at present standard conditions are used in the controlled-climate chamber, which clearly cannot be optimum for each batch of eggs that is placed in the controlled-climate chamber.

In view of the above, the aim of the present invention is to provide a method of the type mentioned in-the preamble with which the temperature in a controlled-climate chamber can be so adjusted that the temperature conditions are better matched to the quantity of eggs that is present in the controlled-climate chamber than are those according to the state of the art.

Said aim is achieved according to the present invention in that the present invention provides a method for controlling the temperature in a controlled-climate chamber, wherein:
- an organism, such as a plant or an animal, is placed in the controlled-climate chamber,
- the temperature in the controlled-climate chamber is kept essentially constant at a specific value (T1),
- at least one growth characteristic (G) of the organism, such as, for example, the $CO_2$ production, is measured,
- the temperature in the controlled-climate chamber is raised or lowered by a specific value ($\delta T$),
- the magnitude of the growth characteristic (G) is measured again,
- the variation in the measured value of the growth characteristic is determined ($\delta G$), and
- the temperature in the controlled-climate chamber is adjusted, depending on the variation in the measured value of the growth characteristic ($\delta G$) that has been determined.

With this procedure it is possible that the new temperature set in the controlled-climate chamber is the original temperature in the controlled-climate chamber (T1) raised or lowered by the temperature jump determined ($\delta T$) at the point in time when the variation in the measured value of the growth characteristic ($\delta G$) is greater than 0, the new temperature set being the originally set temperature (T1) at the point in time when the variation in the growth characteristic ($\delta G$) that has been determined is less than 0.

The method according to the invention makes it possible to measure one or more specific growth characteristics of the organism that is present in the controlled-climate chamber. For many organisms it is simplest to determine the $CO_2$ production. The temperature in the controlled-climate chamber can then be varied. The temperature in the controlled-climate chamber is, for example, raised somewhat. After some time has elapsed the value of the growth characteristic, such as, for example, the $CO_2$ production, is determined again.

If it is found that the rise in temperature has a beneficial effect on the growth of the organism in the controlled-climate chamber, the temperature can be maintained at the newly set temperature level. If it is found that the change in temperature has had an adverse effect on the growth of the organism in the controlled-climate chamber, the controlled-climate chamber can then be switched back to the original temperature level in the controlled-climate chamber. It is possible, for example, alternately to raise and lower the temperature in the controlled-climate chamber in order continuously to seek the optimum value of the temperature in the controlled-climate chamber in order to promote the growth of the organism in the controlled-climate chamber as much as possible.

It is clear that if the organism present in the controlled-climate chamber has essentially the same characteristics as,an organism that was previously grown in the controlled-climate chamber, temperature variations that proved favourable for such a previous organism can be used as a guideline for raising or lowering the temperature in the controlled-climate chamber.

According to the invention it is advantageous that the temperature jump ($\delta T$) has a value of 0 to 1°, preferably 0.1 to 0.6°and most preferentially 0.2°.

Organisms that grow in a controlled-climate chamber will usually thrive best at a certain temperature level. It is obvious to raise or to lower the temperature by small steps from this temperature level. In the specific case of eggs, it is advantageous to make the variations no greater than a few tenths of a degree.

According to the invention it is furthermore possible to determine the value of the growth characteristic again after a time interval has elapsed following the change in the temperature in the controlled-climate chamber, the time interval having a value of 10 to 20 minutes, preferably 15 minutes.

In order to be able effectively to measure the effect of the change in temperature on the growth of an organism the new temperature must be able to act on the organism for a specific interval. That is to say, there is no point in measuring the influence of the temperature over very short time intervals (for example a few seconds). In the case of eggs a minimum interval of, for example, 15 minutes is usually adequate.

It is clear that the method according to the present invention is not intended for a one-off adjustment of the temperature level in a controlled-climate chamber. The intention is that the optimum temperature is continually re-sought and re-adjusted during the residence time of the organism in the controlled-climate chamber. This means that the method steps that have been described above are repeated in whole or in part many times in succession. What is achieved in this way is that the temperature level in the controlled-climate chamber is kept essentially optimum during the entire residence time of the organism in the controlled-climate chamber.

According to the invention it is furthermore possible that eggs are placed in an incubator and the temperature in the incubator is kept essentially at a constant temperature, at least one growth characteristic of the eggs in the incubator is determined, the temperature in the incubator is raised or lowered by a specific temperature jump, the growth characteristic of the eggs is determined again, the variation in the measured value of the growth characteristic is determined and the temperature in the controlled-climate chamber is then adjusted, depending on the value of the variation in the measured growth characteristic. With this procedure it is possible that the $CO_2$ production by the eggs is determined as the growth characteristic of the eggs.

As has already been indicated above, the method according to the invention is suitable in particular for hatching eggs in an incubator. In practice it proves readily possible to determine the variation in the $CO_2$ production in an incubator. The $CO_2$ production is a very good indication of the growth of the embryos in the eggs.

As an alternative, the change in the temperature of the embryos in an incubator can also be determined. The change in temperature can be determined in two ways. Firstly, the temperature of the eggs themselves can be determined, keeping an eye on the variations in temperature. Secondly, it is possible to determine the change in temperature in the entire controlled-climate chamber. The change in temperature is directly linked to the amount of cooling that has to be supplied to the installation.

Furthermore, it is possible to determine the oxygen consumption of the eggs as the growth characteristic of the eggs. The embryos in the eggs will have a heart, the heartbeat of which can also be determined as the growth characteristic for the embryos.

The invention further relates to a computer-readable medium, said medium comprising a computer program which, after loading on an installation provided with computer means, provides the installation with the functionality of the method.

In a further aspect the present invention relates to a controlled-climate chamber provided with means for maintaining an essentially constant temperature in said controlled-climate chamber, which controlled-climate chamber is provided with measurement means for measuring a growth characteristic of an organism, such as a plant or an animal, placed in the controlled-climate chamber. The installation according to the invention is characterised in that the controlled-climate chamber has control means, with the aid of which the temperature in the controlled-climate chamber can be controlled, the measurement means for measuring a growth characteristic of an organism placed in the controlled-climate chamber being connected to the control means in such a way that, with the aid of the measurement means, a control signal can be transmitted to the control means for varying the temperature in the controlled-climate chamber.

As has been indicated above, an installation for hatching eggs is disclosed in Netherlands Patent 1 009 860, in the name of the same Applicant. There is already a $CO_2$ meter in this installation. According to the invention, however, control means are present for changing the temperature in the controlled-climate chamber, which control means are able to use a read-out from the $CO_2$ meter as input signal. The same control means are lacking in the known controlled-climate chamber.

As an alternative it is also possible to install a temperature meter for determining the change in temperature of the eggs in the controlled-climate chamber according to the invention. It is also possible to measure the oxygen consumption. Furthermore, it is possible that measurement means are present for determining the heartbeat of the embryos in the controlled-climate chamber.

The invention will be further described with reference to the appended FIGURE, in which: a side view can be seen of the controlled-climate chamber according to the invention, which can be used in accordance with the method according to the invention.

A controlled-climate chamber 1 which has an outside wall 2 is shown in the FIGURE. A compartment in which carts 4 are arranged is separated off in the controlled-climate chamber 1 by means of a further wall 3. Trays 5, which contain eggs which have to be hatched, can be placed in the carts 4. An airflow, which is indicated diagrammatically by reference numeral 7, is generated in the controlled-climate chamber 1 with the aid of a pump 6. In the FIGURE the airflow will pass anticlockwise through the installation. The airflow will enter the compartment 10 from the left and leave it at the right. The airflow flows over the eggs that have been placed in the trays 5 in the carts 4. Before it enters the compartment 10, and after it has passed through one or more carts 4, the airflow 7 is forced through the perforated wall 11. This perforated wall 11 contains means for adjusting the temperature of the airflow 7. If the airflow 7 has released heat to the eggs in the trays 5, the temperature can then increase in order to compensate for the temperature variation. Conversely, it is possible that if the airflow has taken up heat from the eggs in the trays 5 the air is cooled in order to bring the temperature back down to the level before the air was blown over the trays 5. The description of the installation according to the FIGURE is limited in this application and reference is made to the abovementioned Netherlands Patent 1 009 860 for a detailed description of the installation according to the FIGURE.

In the installation according to the FIGURE, further measurement means 20 are present for determining the $CO_2$ content in the airflow 7. It is, for example, possible to perform the $CO_2$ determination at various locations in the controlled-climate chamber 1. A first determination of $CO_2$ production in the controlled-climate chamber 1 is made at the point in time when a certain temperature can be kept essentially constant in the controlled-climate chamber.

Following this first determination of the $CO_2$ content in the controlled-climate chamber 1, the temperature in the controlled-climate chamber is raised with the aid of, inter alia, the walls 11 in the controlled-climate chamber. If the temperature in the controlled-climate chamber 1 has to be set to a new level, which will be higher or lower than the original temperature, a second determination of the $CO_2$ production in the controlled-climate chamber 1 is carried out. The first value determined is then compared with the second value determined. If the first value is higher, the change in temperature is apparently adverse for the growth of the organisms in the controlled-climate chamber 1. The temperature will be readjusted to the original level. If, on the other hand, the second determination proves to give a higher result than the first determination of the $CO_2$ content, the second temperature level is then apparently more favourable for the organism in the controlled-climate chamber 1. That is to say the reset temperature level is maintained as the new temperature level in the controlled-climate chamber.

After some time has elapsed the method discussed above can be repeated, the temperature being changed again and a third, fourth, etc. determination of the $CO_2$ content in the controlled-climate chamber 1 being carried out after some time has elapsed.

With the aid of the installation that has been described above, and with the aid of the method discussed, the temperature conditions in the controlled-climate chamber 1 can be kept optimum during the entire period that the organism is kept in the controlled-climate chamber 1.

Instead of meters 20 for determining the $CO_2$ content, it is also possible to fit a meter in the controlled-climate chamber 1 for determining the oxygen consumption of the organism in the controlled-climate chamber 1. Furthermore, it is possible to fit temperature meters distributed in the controlled-climate chamber 1 for measuring the heat that is produced by the organism in the controlled-climate chamber 1. In the specific case where eggs are hatched in the controlled-climate chamber 1 it is also possible to fit means for recording the heartbeat of the embryos in the eggs in the controlled-climate chamber 1.

What is claimed is:

1. Method for controlling the temperature in a controlled-climate chamber, wherein:
   an organism is placed in the controlled-climate chamber,
   the temperature in the controlled-climate chamber is kept essentially constant at a specific value (T1),
   at least one growth characteristic (G) of the organism is measured,
   the temperature in the controlled-climate chamber is raised or lowered by a specific value ($\delta T$),
   the magnitude of the growth characteristic (G) is measured again,
   the variation in the measured value of the growth characteristic is determined ($\delta G$), and
   the temperature in the controlled-climate chamber is adjusted, depending on the variation in the measured value of the growth characteristic ($\delta G$) that has been determined.

2. Method according to claim 1, characterised in that the new temperature set in the controlled-climate chamber is the original temperature in the controlled-climate chamber (T1) raised or lowered by the temperature jump determined ($\delta T$) at the point in time when the variation in the measured value of the growth characteristic ($\delta G$) is greater than 0, the new temperature set being the originally set temperature (T1) at the point in time when the variation in the growth characteristic ($\delta G$) that has been determined is less than 0.

3. Method according to claim 1, characterised in that the temperature jump ($\delta T$) has a value of 0 to 1°.

4. Method according to claim 1, characterised in that the value of the growth characteristic (G) is determined again after a time interval has elapsed following the change in the temperature in the controlled-climate chamber, the time interval having a value of 10 to 20 minutes.

5. Method according to claim 1, characterised in that all or some of the steps of the method are repeated after a certain period has elapsed.

6. Method according to claim 1, characterised in that eggs are placed in an incubator and the temperature in the incubator is kept essentially at a constant temperature, at least one growth characteristic of the eggs in the incubator is determined, the temperature in the incubator is raised or lowered by a specific temperature jump, the growth characteristic of the eggs is determined again, the variation in the measured value of the growth characteristic is determined and the temperature in the controlled-climate chamber is then adjusted, depending on the value of the variation in the measured growth characteristic.

7. Method according to claim 6, characterised in that the $CO_2$ production by the eggs is determined as the growth characteristic of the eggs.

8. Method according to claim 6 characterised in that the heat production by the eggs is determined as the growth characteristic of the eggs.

9. Method according to claim 6, characterised in that the oxygen consumption is determined as the growth characteristic of the eggs.

10. Method according to claim 6, characterised in that the heart rhythm of the embryo in the egg is determined as the growth characteristic of the eggs.

11. Computer-readable medium, characterised in that this contains a computer program which, after loading on an installation provided with computer means, provides the installation with the functionality of the method according to claim 1.

12. Method according to claim 1, characterised in that the temperature jump ($\delta T$) has a value of 0.1 to 0.6°.

13. Method according to claim 1, characterised in that the temperature jump ($\delta T$) has a value of 0.2°.

14. Method according to claim 1, characterised in that the value of the growth characteristic (G) is determined again after a time interval has elapsed following the change in the temperature in the controlled-climate chamber, the time interval having a value of 15 minutes.

15. Method according to claim 1 wherein the organism is a plant or an animal.

16. Method according to claim 1 wherein the measured growth characteristic (G) is $CO_2$ production.

17. Controlled-climate chamber provided with temperature means for maintaining an essentially constant temperature in said controlled-climate chamber, which controlled-climate chamber is provided with measurement means for measuring a growth characteristic of an organism placed in the controlled-climate chamber, characterised in that the controlled-climate chamber has control means connected to both the temperature means and the measurement means, wherein the control means are adapted to first determine a first value of the growth characteristic by means of the measurement means, and wherein the control means are adapted for thereafter raise or lower the temperature in the controlled-temperature chamber by a specific value (δT) by means of the temperature means and wherein the control means are adapted to compare said first value of the growth characteristic with said second value of the growth characteristic and wherein the control means are adapted for maintaining the new temperature level in the controlled-climate chamber in case the second value of the growth characteristic is higher than the first value of the growth characteristic and wherein the control means are adapted to readjust the temperature to the original level if the second value of the growth characteristic is lower than the first value of the growth characteristic.

18. Installation according to claim 17, characterised in that the measurement means for measuring a growth char acteristic of an organism placed in the controlled-climate chamber comprise a $CO_2$ meter.

19. Installation according to claim 17, characterised in that the means for measuring a growth characteristic of an organism placed in the controlled-climate chamber comprise means for measuring the heat produced by art organism placed in the controlled-climate chamber.

20. Installation according to claim 17, characterised in that the means for measuring a growth characteristic of an organism placed in the controlled-climate chamber comprise means for measuring the oxygen consumption by the organism.

21. Installation according to claim 17, characterised in that the means for measuring a growth characteristic for an organism placed in the controlled-climate chamber comprise means for recording the heart rate of an embryo in an egg.

22. Installation according to claim 17 wherein the organism is a plant or an animal.

* * * * *